United States Patent
Liu

(10) Patent No.: US 7,818,634 B2
(45) Date of Patent: Oct. 19, 2010

(54) DETECTING METHOD AND SYSTEM FOR CONSISTENCY OF LINK SCRAMBLING CONFIGURATION

(75) Inventor: Shaowei Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 12/122,315

(22) Filed: May 16, 2008

(65) Prior Publication Data
US 2008/0215934 A1 Sep. 4, 2008

Related U.S. Application Data

(63) Continuation of application No. PCT/CN2006/002000, filed on Aug. 8, 2006.

(30) Foreign Application Priority Data
Nov. 16, 2005 (CN) .................. 2005 1 0101346

(51) Int. Cl.
G06F 11/00 (2006.01)
G01R 31/28 (2006.01)
G01R 31/08 (2006.01)
G08C 15/00 (2006.01)

(52) U.S. Cl. .................. 714/704; 714/712; 714/43; 370/248

(58) Field of Classification Search .................. None
See application file for complete search history.

(56) References Cited

U.S. PATENT DOCUMENTS

| | | | |
|---|---|---|---|
| 5,473,696 A | 12/1995 | van Breemen et al. | |
| 6,526,039 B1 | 2/2003 | Dahlman et al. | |
| 6,678,854 B1 * | 1/2004 | Irvin | 714/752 |
| 6,775,237 B2 | 8/2004 | Soltysiak et al. | |
| 6,952,480 B1 | 10/2005 | Martin | |
| 7,420,627 B2 * | 9/2008 | Takagi et al. | 348/725 |
| 7,496,804 B2 * | 2/2009 | Juncker | 714/704 |

(Continued)

FOREIGN PATENT DOCUMENTS

CN 1500244 A 5/2004

(Continued)

OTHER PUBLICATIONS

Office Action from corresponding China Patent Application No. 20051010346.1.

*Primary Examiner*—Christine T Tu
(74) *Attorney, Agent, or Firm*—Leydig, Voit & Mayer, Ltd.

(57) ABSTRACT

A detecting method for the consistency of a link scrambling configuration, comprises: setting the first threshold of the data packet error rate received by the receiving end; when the receiving end receiving date from the link, counting the received data packet error rate; judging whether the error rate is above the set first threshold; if yes, determining that the link scrambling configurations between transmitting end and receiving end are inconsistent; if not, determining that the link scrambling configurations between transmitting end and receiving end are consistent. The invention provides that the ports could detect the consistency of the link scrambling configuration automatically when configuring the link scrambling code, thereby enables the receive device to adjust the configuration of scrambling code to achieve the consistency of scrambling code between both ends of the link, and improves the maintenance of devices.

11 Claims, 2 Drawing Sheets

U.S. PATENT DOCUMENTS

| | | |
|---|---|---|
| 2002/0122557 A1 | 9/2002 | Aihara et al. |
| 2003/0103476 A1 | 6/2003 | Choi et al. |
| 2003/0174686 A1 | 9/2003 | Willenegger et al. |

FOREIGN PATENT DOCUMENTS

| | | |
|---|---|---|
| CN | 1543162 A | 11/2004 |
| CN | 1581748 A | 2/2005 |
| EP | 1 489 762 A1 | 12/2004 |
| WO | WO 99/41854 A1 | 8/1999 |
| WO | WO 01/78269 A1 | 10/2001 |
| WO | WO 03/079577 A2 | 9/2003 |

\* cited by examiner

DETECTING METHOD AND SYSTEM FOR CONSISTENCY OF LINK SCRAMBLING CONFIGURATION

CROSS-REFERENCE TO RELATED APPLICATION

This application is a continuation of International Patent Application No. PCT/CN2006/002000, filed Aug. 8, 2006, which claims priority to Chinese Patent Application No. 200510101346.1, filed on Nov. 16, 2005, both of which are hereby incorporated by referenced in their entirety.

FIELD OF THE INVENTION

The present invention relates to the field of transmission, and in particular to a method and a system for detecting consistency of link scrambling configurations.

BACKGROUND OF THE INVENTION

In Synchronous Optical Network (SONET) technologies and Synchronous Digital Hierarchy (SDH) technologies in the field of transmission, according to requirements of physical layer protocols, consecutive all zeros or ones should not occur in a data transmission signal because no synchronous clock can be extracted from the consecutive all zeros or ones. In order to prevent occurrence of such phenomena in the signal, a scrambling code technology has been adopted in the industry, which principle is to randomize digit bits in the signal to prevent consecutive all zeros or ones from occurring in the signal.

Currently, the International Telecommunication Union (ITU) specifies two scrambling code technologies which adopt two respective scrambling code algorithms.

One algorithm is a scrambling code technology specified in the GR-253 standards, in which digit bits in a synchronous head of a data frame are scrambled in accordance with an algorithm of 1+x6+x7. In this technology, the scrambling function takes effect all the time and may not be disabled, so the scrambling configurations of the two ends are consistent all the time.

The other algorithm is a scrambling code technology specified in the I.432 standards, in which a scrambling formula of the type of Asynchronous Transfer Mode (ATM) is specified and digit bits in a synchronous head of a data frame are scrambled in accordance with a polynomial algorithm of 1+x43. In this technology, it is not necessary for a transmitting end to inform a receiving end about whether a scrambling is required. The scrambling function is configurable, that is, it can be enabled or disabled through configuration, and therefore the scrambling configurations of both parties of a link connection using this technology may possibly be inconsistent.

In order to ensure a correct transmission and reception of data, it is required in a link using the scrambling code technology that the scrambling configurations of the transmitting end and the receiving end should be consistent, that is, when one of two parities connected through the link configures the scrambling function as "Enabled", the other shall also configure the scrambling as "Enabled", otherwise, when all data sent from the transmitting end is scrambled, if the receiving end does not configure the scrambling function as "Enabled", it can not identify received data, or if the transmitting end does not configure the scrambling function as "Enabled" while the receiving end does, the receiving end can not identify the received date either. Consequently, in practical applications, the use of the above scrambling technology in the I.432 standards may be faced with the issue of detecting consistency of link scrambling configurations.

At present, the above scrambling configurations at the transmitting end and the receiving end are generally accomplished manually, and the consistency of scrambling configurations at both ends of a link is also detected manually. That is, the receiving end has to manually obtain the scrambling configurations of devices at the opposite ends to determine consistency of the scrambling configurations at the two ends. This may give rise to certain problems in practical applications. For example, when devices from two operators are docked, in order for the receiving end to learn about the scrambling configuration at the opposite end, it is required to manually detect whether the scrambling configurations of both parties are consistent, which is not convenient in terms of operations and maintenance. Furthermore, when the device at one end modifies its scrambling configuration during normal operation without informing a device at the opposite end, the device at the opposite end can not receive correct data packets, and therefore normal communications are affected, and if consistency of the scrambling configurations at the two ends is detected through human intervention, operations and maintenance are still time consuming, laborious and inconvenient.

SUMMARY OF THE INVENTION

The technical problem of the present invention is how to provide a method for detecting consistency of link scrambling configurations of a transmitting end and a receiving end in a link, so as to implement convenient and rapid operations and link maintenance.

In order to solve the above problem, the invention provides a method for detecting consistency of link scrambling configurations, which includes the steps of:

a) setting a first threshold of an error ratio of data packets received by the receiving end;

b) counting an error ratio of received data packets; and c) determining whether the error ratio is above the first set threshold, and if yes, determining that the link scrambling configurations of the transmitting end and the receiving end of the link are inconsistent; otherwise, determining that the link scrambling configurations of the transmitting end and the receiving end of the link are consistent.

Optionally, if the error ratio is above the first set threshold:

c1) counting an error ratio of received data packets during further one or at least two periods; and c2) determining whether the error ratio of the data packets in each of the periods is above a second set threshold, and if the error ratio of the data packets in each of the periods is above a second set threshold, determining that the link scrambling configurations of the transmitting end and the receiving end of the link are inconsistent; otherwise, returning to step b) for a new determination.

If the error ratio of the data packets in each of the periods is above the seconds set threshold, it is determined whether the link scrambling configurations of the transmitting end and the receiving end of the link have been determined previously as inconsistent, and if yes, alarm information is generated; otherwise it is determined that the link scrambling configurations of the transmitting end and the receiving end of the link are inconsistent.

The first threshold and the second threshold are the same.

Optionally, if the error ratio is above the first set threshold, it is determined whether the link scrambling configurations of the transmitting end and the receiving end of the link have been determined previously as inconsistent, and if yes, alarm information is generated; otherwise it is determined that the link scrambling configurations of the transmitting end and the receiving end of the link are inconsistent.

The alarm information includes host alarm information and network administrator alarm information.

The error ratio of data packets is the ratio of received data packets having a CRC error to all received data packets during a period of time.

Compared with the prior arts, the present invention has the following advantages:

In the present invention, thresholds are preset for an error ratio of data packets received by the receiving end at the time when the scrambling configurations of the link of the transmitting end and the receiving end are inconsistent. When data are received practically, consistency of the scrambling configurations of the transmitting end and the receiving end can be determined automatically in accordance with relationships between an error ratio of data packets received by the receiving end and the thresholds, without need of human intervention in obtaining the scrambling configuration at the opposite end to determine their consistency. With the inventive method, a device at the receiving end is able to adjust its scrambling configuration (by enabling or disabling the scrambling configuration function) in accordance with a determination result, thereby facilitating the operations and maintenance of the device.

DETAILED DESCRIPTION OF THE INVENTION

Exemplary embodiments of the invention are described in details as follows with reference to the drawings.

In the present invention, a link may be a packet over SONET or IP over SONET/SDH (POS) link or other links with scrambling configurations. When the scrambling configurations of a transmitting end and a receiving end are inconsistent during transmission of data over the link, received data packets having a Cyclic Redundancy Check (CRC) error will be increased because the receiving end can not descramble received data packets. In view of this situation, a CRC error ratio of the data packets received at the receiving end can be counted when data are received at the receiving end to determine correctness of contents of the received data packets, and further determine whether the current scrambling configuration is the same with that of the transmitting end, and in accordance with the determination result, decide whether needs to adjust the link scrambling configurations.

Figure 1:
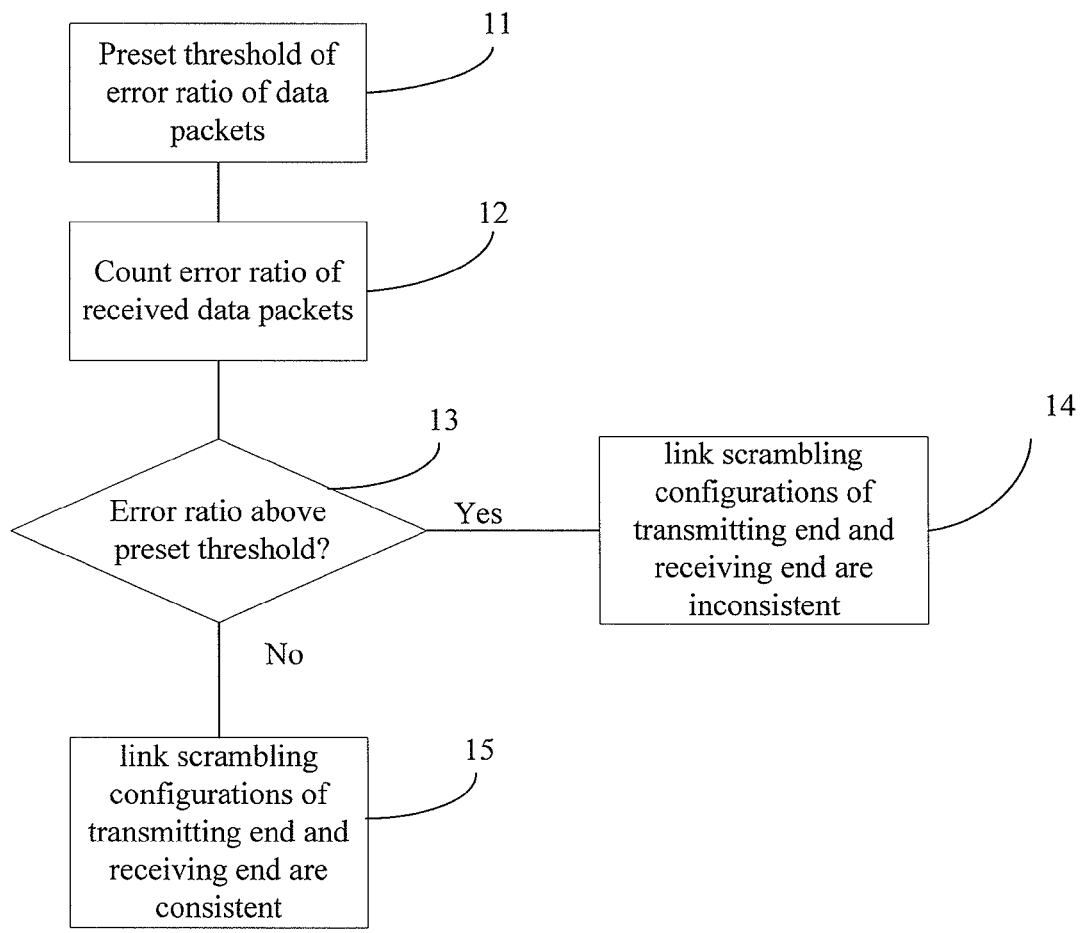
FIG. 1 is a flow diagram of a method according to a first embodiment of the present invention.

With reference to FIG. 1, it is a flow diagram of a method according to a first embodiment of the present invention.

Firstly, a threshold (referred to as a first threshold to be distinguished from a second threshold below in the embodiment) is preset for an error ratio of data packets received at the receiving end when the link scrambling configurations of the transmitting end and the receiving end are inconsistent (step 11), and the error ratio of data packets as mentioned in the present invention refers to the ratio of received data packets having a Cyclic Redundancy Check (CRC) error to all received data packets during a period of time. In a specific detection, when data packets are received via a port of the receiving device, a CRC error ratio of received data packets is counted firstly (step 12); it is determined whether the error ratio of the data packets received by the receiving end is above the first preset threshold (step 13). When the CRC error ratio of the data packets received via the port is relatively high (for example above the first preset threshold), it is determined that the current configuration is inconsistent with that of the opposite end and the current scrambling configuration needs to be modified (step 14); and when the CRC error ratio of the data packets received via the port is relatively low (for example below or equal to the first preset threshold), it is determined that the current scrambling configuration is consistent with that of the opposite end, and there is no need to modify the current scrambling configuration (step 15).

In a specific implementation, in order to ensure the reliability of a detection result, an error ratio of data packets received during further one or at least two continuous periods may also be counted before it is determined that the link scrambling configurations of the transmitting end and the receiving end of the link are inconsistent, and then it is determined whether the error ratio of the data packets during each of the periods is above a second preset threshold. If the determination result is YES, it can be determined that the link scrambling configurations of the transmitting end and the receiving end of the link are inconsistent, or if the determination result is NO, a new determination may be reinitiated. The second threshold may be the same as or different from the first threshold dependent upon practical situations.

It needs to be noted that in a specific situation, if a CRC error ratio of data packets previously received via the port is above the first preset threshold, the scrambling configuration of the port needs to be modified, but if the CRC error ratio of data packets currently received is still above the first preset threshold, it can be determined that the problem is caused due to other reasons (e.g., the link is not stable, the optical power has problem, etc.) instead of the scrambling configuration, and at this time, alarm information may be generated, including host alarm information, network administrator alarm information, and etc.

The thresholds may be preset at a relatively reasonable value, e.g., 50%, dependent upon practical requirements, which will not described any more here.

Figure 2:
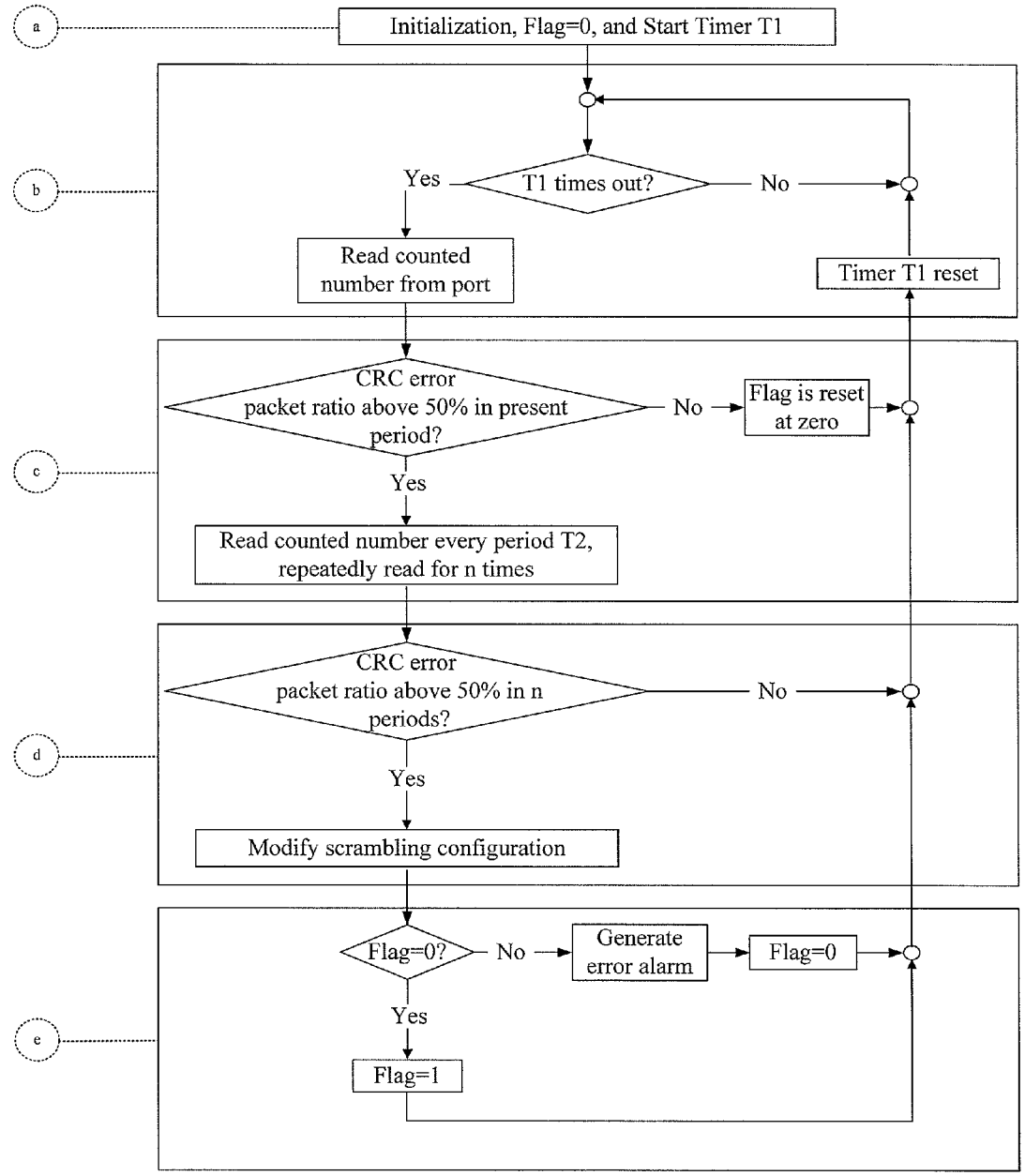
FIG. 2 is a flow diagram of a method according to a second embodiment of the present invention.

In accordance with the above thoughts, as illustrated in FIG. 2, when a port of a device operates normally, the received data is processed in the following flow.

a: A timer T1 and a flag bit FLAG are reset at zero upon initialization of a port. The flag bit FLAG indicates whether the scrambling configuration has been modified once.

b: Determine whether the timer T1 times out; if the timer T1 times out, a CRC error ratio of data packets received via the port during the present period of the timer is counted and the flow goes to step c; otherwise, the flow waits until the timer T1 times out.

c: Determine whether the counted CRC error ratio of the data packets is above 50%; and if the counted CRC error ratio of the data packets is above 50%, a CRC error ratio of data packets received via the port during each of further continuous periods T2 is counted during respective period T2, and the flow goes to step d; otherwise, it is determined that the current scrambling configuration of the receiving end is consistent with that of the transmitting end, and the flag bit FLAG is reset at zero, the timer T1 is reset, and the flow returns to step b for a new determination.

d: Determine whether each of the counted CRC error ratios is above 50%; if each of the counted CRC error ratios is above 50%, it is determined that the current scrambling configuration of the receiving end is inconsistent with the transmitting end, and the current scrambling configuration is modified and the flow goes to step e; otherwise, the error rate is considered as a false one, the timer T1 is reset, and the flow returns to step b for a new determination e: Determine whether the flag bit FLAG is zero; if the flag bit FLAG is zero, it is indicated that the scrambling configuration has not been modified prior to the present modification or the scrambling configuration of the port is correct prior to the present modification. In such a situation, the flag bit FLAG is set at one, the timer T1 is reset, a next period T1 starts, and the flow returns to step b to further determine whether the configuration modification is successful. If the flag bit FLAG is not zero, it is indicated that the scrambling configuration has been modified once, but the modification is not successful. In such a situation, it is believed that the problem is not caused due to the scrambling configurations, and alarm information is generated, the flag bit is reset at zero, the timer T1 is reset, a next period T1 starts and the flow returns to step b for next determination.

In accordance with the above preferred embodiment of the invention, the determination of the current scrambling configuration of the port has three results, i.e., the scrambling configuration of the receiving end is consistent with that of the transmitting end; the scrambling configuration of the receiving end is inconsistent with that of the transmitting end; or there is a link failure, which correspond to three flows in which steps are performed respectively.

Particularly in the present invention, the first flow is as follows when the scrambling configuration of the receiving end is consistent with that of the transmitting end:

s11: The timer T1 and the flag bit FLAG are reset at zero upon initialization of a port. The flag bit FLAG indicates whether the scrambling configuration has been modified once.

s12: Determine whether the timer T1 times out; if the timer T1 times out, a CRC error ratio of data packets received via the port during the present period of the timer is counted, and the flow goes to step s13; otherwise, the flow waits until the timer T1 times out.

s13: The counted CRC error ratio of the data packets is below 50%; the current scrambling configuration of the receiving end is consistent with that of the transmitting end; the flag bit FLAG is reset at zero and the timer T1 is reset, and the flow returns to step s13 for next determination.

Particularly in the present invention, the second flow is as follows when the scrambling configuration of the receiving end is inconsistent with that of the transmitting end:

s21: The timer T1 and the flag bit FLAG are reset at zero upon initialization of the port. The flag bit FLAG indicates whether the scrambling configuration has been modified once.

s22: Determine whether the timer T1 times out; if the timer T1 times out, a CRC error ratio of data packets received via the port during the present period of the timer is counted, and the flow goes to step s23; otherwise, the flow waits until the timer T1 times out.

s23: The counted CRC error ratio of the data packets is above 50%; a CRC error ratio of data packets received via the port during each of continuous periods T2 is further counted, and the flow goes to step s24.

s24: Each of the counted CRC error ratios is above 50%; it is determined that the current scrambling configuration of the receiving end is inconsistent with that of the transmitting end; the current scrambling configuration is modified, and the flow goes to step s25.

s25: The flag bit FLAG is zero, which indicates that the scrambling configuration has not been modified prior to the present modification or the scrambling configuration of the port is correct prior to the present modification; the flag bit FLAG is set at one, the timer T1 is reset, a next period T1 starts and the flow returns to step s22 for further determination.

s22: Determine whether the timer T1 times out; if the timer T1 times out, a CRC error ratio of data packets received via the port during the present period of the timer is counted, and the flow goes to step s23; otherwise, the flow waits until the timer T1 times out.

s23: The counted CRC error ratio of the data packets is below 50%; the scrambling configuration of the receiving end is consistent with that of the transmitting end; the flag bit FLAG is reset at zero, the timer T1 is reset, and the flow returns to the step s22 for next determination.

Particularly in the present invention, the third flow is as follows when there is a link failure:

s31: The timer T1 and the flag bit FLAG are reset at zero upon initialization of the port. The flag bit FLAG indicates whether the scrambling configuration has been modified once.

s32: Determine whether the timer T1 times out; if the timer T1 times out, a CRC error ratio of data packets received via the port during the present period of the timer is counted, and the flow goes to step s33; otherwise, the flow waits until the timer T1 times out.

s33: The counted CRC error ratio of the data packets is above 50%, and a CRC error ratio of data packets received via the port during each of continuous periods T2 is counted, and the flow goes to step s34.

s34: Each of the counted CRC error ratios is above 50%; the current scrambling configuration of the receiving end is inconsistent with that of the transmitting end; the current scrambling configuration is modified, and the flow goes to step s35.

s35: The flag bit FLAG is zero, which indicates that the scrambling configuration has not been modified prior to the present modification or the scrambling configuration of the port is correct prior to the present modification; the flag bit FLAG is set at one, the timer T1 is reset, a next period T1 starts and the flow returns to step s22 for further determination.

s32: Determine whether the timer T1 times out; if the timer T1 times out, a CRC error ratio of data packets received via the port during the present period of the timer is counted, and the flow goes to the step s33; otherwise, the flow waits until the timer T1 times out.

s33: The counted CRC error ratio of the data packets is above 50%, and a CRC error ratio of data packets received via the port during each of continuous periods T2 is counted, and the flow goes to step s34.

s34: Each of the counted CRC error ratios is above 50%; the current scrambling configuration of the receiving end is considered as incorrect and is modified, and the flow goes to step s35.

S35: The flag bit FLAG is one, which indicates that the scrambling configuration has been modified once and the modification is not successful. In such a situation, it is considered that the problem is not caused due to the scrambling configuration, and alarm information is generated; the flag bit is reset at zero, the timer T1 is reset, a next period T1 starts and the flow returns to step s32 for next determination.

The foregoing descriptions are merely illustrative of the exemplary embodiments of the invention. It shall be noted that those ordinarily skilled in the art can make numerous modifications and variations without departing from the spirit of the invention, and these modifications and variations shall be considered as coming into the scope of the invention as defined in the appended claims.

The invention claimed is:

1. A method for detecting consistency of link scrambling configurations of a receiving end and a transmitting end of a link, comprising:
   (1.1) counting an error ratio of received data packets during a first period;
   (1.2) determining whether the error ratio is above a first threshold;
   (1.3) if the error ratio is above the first threshold, determining that the link scrambling configurations of the transmitting end and the receiving end are inconsistent; and
   (1.4) if the error ratio is not above the first threshold, determining that the link scrambling configurations of the transmitting end and the receiving end are consistent;
   (2.1) if the error ratio is above the first threshold, counting an error ratio of data packets received during at least one second period;
   (2.2) determining whether the error ratio of the data packets in each of the second periods is above a second threshold;
   (2.3) if the error ratio of the data packets in each of the second periods is above the second threshold, determining that the link scrambling configurations of the transmitting end and the receiving end of the link are inconsistent; and
   (2.4) otherwise, returning to the process (1.1) of counting an error ratio of received data packets during the first period.

2. The method according to claim 1, further comprising:
   if the error ratio of the data packets in each of the second periods is above the second threshold, determining whether the link scrambling configurations of the transmitting end and the receiving end of the link have been determined as inconsistent before the process (2.3), and generating an alarm information if the link scrambling configurations of the transmitting end and the receiving end of the link have been determined as inconsistent before the process (2.3).

3. The method according to claim 2, wherein, the first threshold equals the second threshold.

4. The method according to claim 3, wherein, the alarm information comprises host alarm information and network administrator alarm information.

5. The method according to claim 4, wherein, the error ratio of the data packets is the ratio of received data packets having a cyclic redundancy check error to all received data packets in the first period.

6. The method according to claim 1, further comprising: if the error ratio is above the first threshold, determining whether the link scrambling configurations of the transmitting end and the receiving end of the link have been determined as inconsistent before the process (1.3), and generating an alarm information if the link scrambling configurations of the transmitting end and the receiving end of the link have been determined as inconsistent before the process (1.3).

7. The method according to claim 6, wherein, the alarm information comprises host alarm information and network administrator alarm information.

8. The method according to claim 7, wherein, the error ratio of the data packets is a ratio of received data packets having a cyclic redundancy check error to all received data packets in a period of time.

9. A module for detecting consistency of link scrambling configurations of a receiving end and a transmitting end of a link, comprising:
   a first unit, adapted for counting an error ratio of received data packets during a first period; and
   a second unit, adapted for determining whether the error ratio is above a first threshold; if the error ratio is above the first threshold, determining that the link scrambling configurations of the transmitting end and the receiving end are inconsistent; if the error ratio is not above the first threshold, determining that the link scrambling configurations of the transmitting end and the receiving end are consistent;
   the first unit is further adapted for counting an error ratio of data packets received during at least one second period if the error ratio of the data packets in the first period is above the first threshold; and
   the module further comprises: a third unit, adapted for determining whether the error ratio of the data packets in each of the second periods is above a second threshold; if the error ratio of the data packets in each of the second periods is above the second threshold, determining that the link scrambling configurations of the transmitting end and the receiving end of the link are inconsistent; otherwise, returning to the process of counting an error ratio of received data packets during the first period.

10. The module of claim 9, further comprising:
   a fourth unit, adapted for determining whether the link scrambling configurations of the transmitting end and the receiving end of the link have been determined as inconsistent before the third unit determines that the link scrambling configurations of the transmitting end and the receiving end of the link are inconsistent, and generating an alarm information if the link scrambling configurations of the transmitting end and the receiving end of the link have been determined as inconsistent before the third unit determines that the link scrambling configurations of the transmitting end and the receiving end of the link are inconsistent if the error ratio of the data packets in each of the second periods is above the second threshold.

11. A receiving apparatus, comprising a module for detecting consistency of link scrambling configurations of the receiving apparatus and a transmitting apparatus of a link, wherein the module comprising:
   a first unit, adapted for counting an error ratio of received data packets during a first period; and
   a second unit, adapted for determining whether the error ratio is above a first threshold; if the error ratio is above the first threshold, determining that the link scrambling configurations of the transmitting apparatus and the receiving apparatus are inconsistent; if the error ratio is not above the first threshold, determining that the link scrambling configurations of the transmitting apparatus and the receiving apparatus are consistent
   the first unit is further adapted for counting an error ratio of data packets received during at least one second period if the error ratio of the data packets in the first period is above the first threshold; and
   the module further comprises: a third unit, adapted for determining whether the error ratio of the data packets in each of the second periods is above a second threshold; if the error ratio of the data packets in each of the second periods is above the second threshold, determining that the link scrambling configurations of the transmitting end and the receiving end of the link are inconsistent; otherwise, returning to the process of counting an error ratio of received data packets during the first period.

* * * * *